United States Patent
Grajcar

(10) Patent No.: US 9,756,837 B2
(45) Date of Patent: Sep. 12, 2017

(54) DIFFERENTIAL ILLUMINATION TO SELECT EGG LAYING SITES

(75) Inventor: Zdenko Grajcar, Crystal, MN (US)

(73) Assignee: ONCE Innovations, Inc., Plymouth, MN (US)

( * ) Notice: Subject to any disclaimer, the term of this patent is extended or adjusted under 35 U.S.C. 154(b) by 248 days.

(21) Appl. No.: 13/357,330

(22) Filed: Jan. 24, 2012

(65) Prior Publication Data

US 2012/0186524 A1    Jul. 26, 2012

Related U.S. Application Data

(60) Provisional application No. 61/435,719, filed on Jan. 24, 2011, provisional application No. 61/437,000, filed on Jan. 27, 2011.

(51) Int. Cl.
*A01K 45/00* (2006.01)
*A01K 31/00* (2006.01)
*A01K 31/22* (2006.01)

(52) U.S. Cl.
CPC .......... *A01K 45/00* (2013.01); *A01K 31/005* (2013.01); *A01K 31/22* (2013.01)

(58) Field of Classification Search
CPC ...... A01K 31/005; A01K 31/18; A01K 31/22; A01K 45/00
USPC .................................. 119/6.6, 6.8, 300, 309
See application file for complete search history.

(56) References Cited

U.S. PATENT DOCUMENTS

| | | | |
|---|---|---|---|
| 4,625,728 A | 12/1986 | Schonberg | |
| 4,721,062 A * | 1/1988 | Williams et al. | 119/437 |
| 5,036,797 A * | 8/1991 | Koozer | 119/448 |
| 6,953,266 B1 * | 10/2005 | Ver Hage et al. | 362/253 |
| 2003/0172878 A1 * | 9/2003 | El Halawani et al. | 119/300 |
| 2008/0017120 A1 | 1/2008 | Hawk | |
| 2008/0178819 A1 * | 7/2008 | Sia et al. | 119/300 |
| 2008/0198009 A1 | 8/2008 | Hoeben | |
| 2008/0202443 A1 | 8/2008 | Potter | |

FOREIGN PATENT DOCUMENTS

JP            405199823 A  *  8/1993

OTHER PUBLICATIONS

Translation of JP405199823A "Method for rearing poultry chick".*
"The Effects of Color of Lighting on the Behavior and Production of Meat Chickens", Prayitno et al.*

(Continued)

*Primary Examiner* — Thien Thanh Pham
(74) *Attorney, Agent, or Firm* — McDermott Will & Emery LLP

(57) ABSTRACT

Differential illumination systems and methods selectively provide light having different spectrums in an aviary system for housing animals located within an enclosure, and in the enclosure. A first light source produces light with a first spectrum, and illuminates an internal volume of the aviary system. A second light source produces light with a second spectrum different from the first spectrum, and illuminates the enclosure outside of the aviary system. The first spectrum can have a higher red component than the second spectrum to encourage chicken to lay eggs inside of the aviary system, and the second spectrum can have a higher blue component than the first spectrum to discourage chicken from laying eggs outside of the aviary system.

8 Claims, 3 Drawing Sheets

(56) References Cited

OTHER PUBLICATIONS

"Effect of Wave Length of Light on Growth and Reproduction in Japanese Quail (*Coturnix coturnix japonica*)", Woodward et al.; 1968.*
International Search Report and Written Opinion issued in International PCT/US12/22370 dated May 25, 2012.
Gustafsson et al. "Laying Hens Reactions on Artificial Light in a Floor Housing System". Agric Eng Int: CIGR Journal, Jun. 2010, 12(2): pp. 21-28.
Big Dutchman, "Natura 70: The modern aviary for barn and free range egg production."
Big Dutchman, "Natura 60: The modern aviary for barn and free range egg production."
Farmer Automatic, "Aviary System: Layer Aviary," Josef Kuhlmann GmbH & Co. KG.
Farmer Automatic, "Multi Deck System: Layer Cage," Josef Kuhlmann GmbH & Co. KG.
Farmer Automatic, "Floor System: Layer Floor System," Josef Kuhlmann GmbH & Co. KG.
Farmer Automatic, "Combi System: Combi Layer System," Josef Kuhlmann GmbH & Co. KG.
International Preliminary Report on Patentability issued in International Application No. PCT/US2012/022370 dated Jul. 30, 2013.
Chinese First Office Action issued in corresponding Chinese Application No. 201280007111.4, mailed on May 27, 2014; 13 pages with partial English translation.
Chinese Second Office Action issued in corresponding Chinese Application No. 201280007111.4, mailed on Dec. 17, 2014; 11 pages with partial English translation.

* cited by examiner

| Identify first and second areas, and select lighting parameters for each of the first and second areas | — 202 |

| Illuminate the first area with light having a first spectrum | — 204 |

| Illuminate the second area with light having a second spectrum | — 206 |

DIFFERENTIAL ILLUMINATION TO SELECT EGG LAYING SITES

CROSS-REFERENCE TO RELATED APPLICATIONS

The present application claims the benefit of priority from U.S. Provisional Patent Application Ser. No. 61/435,719, entitled "DIFFERENTIAL ILLUMINATION TO SELECT EGG LAYING SITES" and filed on Jan. 24, 2011, and from U.S. Provisional Patent Application Ser. No. 61/437,000, entitled "SPECTRALLY-ADAPTED ARTIFICIAL ILLUMINATION OF FOWL" and filed on Jan. 27, 2011, which are hereby incorporated by reference in their entireties for all purposes.

BACKGROUND

Specially designed cages are used to house chicken, poultry, or other animals in egg production facilities. The cages include systems for automatically retrieving eggs laid by the animals. The automatic retrieval of the eggs minimizes manual labor costs, while the prompt removal of eggs from the cages ensures that the eggs remain clean and intact (not broken), and that the eggs can be cooled or otherwise processed without delay.

In cage-free facilities, the chicken, poultry, or other animals are free to move around enclosures within the facility. The enclosures generally include nests or other areas specially designed for laying eggs, and systems for automatically retrieving eggs from the nests. However, since the animals can move around the enclosures freely, the animals also lay eggs in non-nest areas within the enclosures. The systems for automatically retrieving the eggs generally cannot retrieve eggs laid outside of the nests, and such eggs are either retrieved manually by workers or lost. Around 20% of the eggs in cage-free facilities are laid outside of the nests, and the loss of these eggs can greatly affect the profitability of egg production facilities.

SUMMARY

In one aspect, a system for providing differential illumination includes an aviary system located within an enclosure, wherein the aviary system includes an internal volume for housing animals, and wherein the animals can move between the aviary system and the enclosure. The system also includes first and second light sources. The first light source produces light with a first spectrum, and illuminates at least part of the internal volume of the aviary system. The second light source produces light with a second spectrum different from the first spectrum, and illuminates at least part of the enclosure outside of the aviary system. The first spectrum can have a higher red component than the second spectrum to encourage chicken to lay eggs inside of the aviary system, and the second spectrum can have a higher blue component than the first spectrum to discourage chicken from laying eggs outside of the aviary system.

In another aspect, a method for controlling lighting and illumination in order to provide differential illumination is provided. According to the method, a part of an enclosure having an aviary system located therein is illuminated with light having a first spectrum, and a part of an internal volume of the aviary system is illuminated with light having a second spectrum. The first spectrum and the second spectrum are different spectrums. The first spectrum can have a higher blue component than the second spectrum to discourage the chicken from laying eggs in the enclosure, and the second spectrum can have a higher red component than the first spectrum to encourage chicken to lay eggs within the aviary system. The illumination can be dimmed, and/or the spectrum of the illumination can be changed.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figures 1, 2:
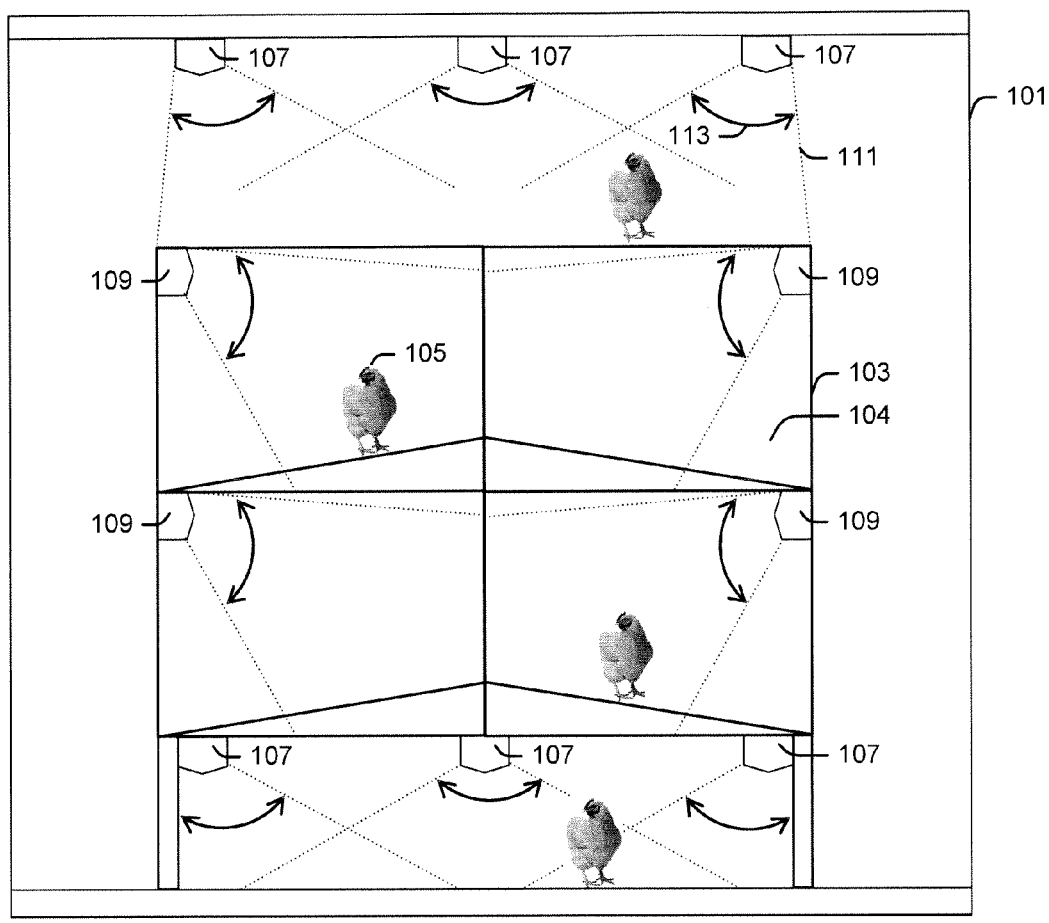
FIG. 1 shows a cross-sectional view of an enclosure containing an aviary system and having a differential illumination system.
FIG. 2 is a flow chart illustrating a method for controlling lighting and illumination in order to provide differential illumination.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Egg production facilities are highly mechanized, and typically include systems for automatically retrieving eggs laid by the chicken, poultry, or other animals promptly after the eggs have been laid. The egg retrieval systems are designed to retrieve eggs from nests or other areas specially designed for laying eggs. Animals typically like to lay eggs in areas that are dark and closed off. Nests are therefore generally designed to be dark and partially closed off (while still maintaining open access for the animals), so as to encourage animals to lay eggs in them.

While a large proportion of eggs are laid in nests or other designated egg laying areas, many eggs are laid outside of these areas. In caged facilities, eggs may be laid in non-nest areas of a cage. In cage-free facilities, eggs may be laid in non-nest areas of an aviary system, or in non-nest areas of an enclosure containing the aviary system. While some egg retrieval systems retrieve eggs from non-nest areas that house animals, such systems do not retrieve all of the mislaid eggs and at least some of these eggs are typically lost.

Behavioral and physiological studies show that animal behavior is influenced by exposure to light in general, and to particular wavelengths of light in particular. For example, exposure to red light (or to light having a red hue) can increase the growth rate of chickens and turkeys at the beginning of the rearing period, increase locomotion that helps minimize leg disorders in the late rearing period, stimulate and promote sexual activity, and reduce feed consumption per egg laid with no differences in egg size, shell weight, shell thickness, or yolk and albumen weights. However, the exposure to red light (or to light having a red hue) can promote cannibalism in broilers. On the other hand, exposure to green and blue light (or to light having green or blue hues) can significantly enhance the animals' growth rate at an early age by enhancing proliferation of skeletal muscle satellite cells, enhance growth at a later age by elevating plasma androgens (in the case of blue light), promote myofiber growth due to more effective stimulation of testosterone secretion, reduce locomotion (in the case of narrow band blue light), and reduce cannibalism rates at late age in broilers (in the case of narrow band blue light).

Light, and more particularly the color or spectrum of light, may therefore be used to influence the behaviors of animals. As used herein, light generally refers to electromagnetic radiation, and more particularly to radiation having wavelengths in the range of 300 to 800 nm. The human eye is sensitive to radiation having wavelengths in the range of 400 to 700 nm, with a peak of sensitivity at around 550 nm (corresponding to green light). However, domestic fowl are sensitive to a broader range of wavelengths both through their eyes, and through their skulls using receptors located in the pineal gland and in the hypothalamus. In particular, domestic fowl are sensitive to light having wavelengths in the range of 300 to 800 nm. Domestic fowls have peak sensitivities to light having wavelengths of around 480 nm (corresponding to blue light), 570 nm (corresponding to green-yellow light), and at 630 nm (corresponding to red light). As such, we refer to light as any radiation in a range of 300 to 800 nm to which animals are visually sensitive (e.g., through eyes) or physiologically sensitive (e.g., through other receptors, such as receptors in the pineal gland and hypothalamus), including radiation commonly referred to as ultra-violet (UV) and infrared (IR).

Light can have different spectrums or spectral contents depending on the particular mixture and relative intensity of wavelengths included in the light. For example, white light (such as natural daylight) generally has a spectrum including a mixture of radiations from 300 to 800 nm at relatively similar intensities. Red light (or redish light) has a spectrum predominantly (or only) including radiation having wavelengths in the "red" range of 635-700 nm (and more generally, wavelengths over 620 nm). Blue light (or bluish light) has a spectrum predominantly (or only) including radiation having wavelengths in the "blue" range of 450-490 nm (and more generally, wavelengths below 500 nm). Green light (or greenish light) has a spectrum predominantly (or only) including radiation having wavelengths in the "green" range of 490-560 nm. A light spectrum predominantly includes radiation of a particular wavelength or range of wavelengths if the relative luminous power (or energy content) of those particular wavelength(s) is higher than the luminous power (or energy content) of other wavelengths in the light spectrum. However, a light that is substantially of a given color can including radiation having a range of wavelengths of the given color, as well as radiation of other wavelengths.

An egg production or other animal facility, such as a cage-free egg production facility, includes a set of enclosures. Each enclosure can be a room, a pen, a corral, a fenced area, a cage, or the like, which houses a group of animals. Animals are able to move within one enclosure, but are generally restricted from moving between different enclosures. Different areas or volumes within the enclosure can be designated for particular uses. For example, a feeding area may be designated around a feeder or other food source in the enclosure, and a watering area may be designated around a water source. Light sources, such as lamps or bulbs, can be installed in or around the enclosure to illuminate different areas of the enclosure. In some examples, directional light sources are used to concentrate, focus, or contain the illumination from each light source within a particular area of the enclosure.

The light sources in the enclosure can produce light with different spectrums, so as to illuminate particular areas of the enclosure with different colored light. The color or spectrum of each light source can be selected so as to promote or encourage certain behaviors in particular areas of the enclosure, and/or to hinder or discourage the same or other behaviors in other areas of the enclosure. For example, a first light source having a spectrum selected so as to encourage feeding may be used to illuminate a feeding area of the enclosure. Additionally or alternatively, a second light source having a spectrum selected so as to encourage egg laying may be used to illuminate a nesting area of the enclosure. The color or spectrum of each light source can also be selected so as to promote or encourage certain behaviors at certain times, and/or to hinder or discourage behaviors at other times. For example, a first light source having a spectrum selected so as to encourage feeding may be used to illuminate all or part of the enclosure at a feeding time (e.g., during a particular time-period every day). Additionally or alternatively, a second light source having a spectrum selected so as to encourage cannibalism at a late age may be used to illuminate all or part of the enclosure when the animals in the enclosure reach the late age.

FIG. 1 shows a cross-sectional view of an enclosure 101 containing an aviary system 103 for housing animals. The enclosure 101 may be one of many enclosures included in an egg production facility and having a differential illumination system 100. Each enclosure 101 houses a group of animals that can move within the enclosure, but are restricted from moving between different enclosures. The enclosure 101 includes one or more aviary systems 103 located within the enclosure. The chicken 105 or other poultry or animals housed in the enclosure 101 can move freely between the enclosure 101 and the aviary system 103 through one or more openings in the aviary system 103.

An aviary system 103 is a structure for housing chicken 105 or other poultry or animals in an interior volume 104 thereof, and for providing various services to the chicken. The aviary system 103 can include supply lines, augers, and/or belt conveyors for conveying inputs to and outputs from the system. For example, the aviary system 103 can supply feed, water, and/or light to the chicken, and can remove litter and recover eggs laid by the chicken. The interior volume 104 of the aviary system 103 can thus include different areas or systems designed or designated for different purposes. For example, the aviary system 103 can include a nest area for laying eggs, one or more feeding or drinking areas for providing food or water to the chicken, one or more roosting areas, or the like.

The enclosure 101 may also include different areas or systems designed or designated for different purposes. For example, the enclosure 101 can include a scratching area, located for example on a floor of the enclosure 101 (e.g., a portion of the floor located underneath the aviary system 103, a portion of the floor located next to or around the aviary system, in an aisle between two or more aviary systems 103, or the like), on top of an aviary system 103 within the enclosure 101, outside of a barn in a case in which the enclosure 101 includes an outdoor section, or the like. The scratching area may be designed for use in scratching, pecking, and/or dust bathing. In some examples, the enclosure may additionally or alternatively include one or more perches or roosting areas separate from the aviary system 103.

Various light sources 107, 109 may be installed to provide illumination in the enclosure 101 and in the aviary system 103. The light sources 107, 109 may be incandescent bulbs, fluorescent lights, light-emitting diode (LED), or other suitable lamps. Each light source 107, 109 produces light with a particular spectrum or selection of radiation wavelengths. Each light source 107, 109 illuminates a designated area of the enclosure 101 and/or aviary system 103. In the example of FIG. 1, for instance, the light sources 107 are located in the enclosure 101 (but outside of the aviary system 103), and are located and oriented so as to illuminate areas located above the aviary system 103 and underneath the aviary system 103. In the example, the light sources 109 are located within the aviary system 103 (e.g., on each of two or more levels within the aviary system), and are located and oriented so as to illuminate areas located within the internal volume 104 of the aviary system 103.

In some examples, the light sources 107, 109 may be directional light sources. Directional light sources produce a directed beam 111 of light having a given width or angle 113 (e.g., a beam angle less than 60 degrees), and are designed to predominantly (or only) provide illumination in a given direction or location. In the example of FIG. 1, for instance, the directional light sources 107 are designed (and mounted and oriented) to concentrate their illumination on an upper surface above the aviary system 103, and in a floor region located underneath the aviary system 103, so as to minimize or avoid the illumination from the sources 107 from penetrating inside of the aviary system 103 (e.g., the light sources 107 are directed away from openings between the internal volume of the aviary system and the enclosure). Conversely, the directional light sources 109 are designed (and mounted and oriented) to concentrate their illumination within the aviary system 103, so as to minimize or avoid illumination from the sources 109 from penetrating outside of the aviary system 103 (e.g., the light sources 109 are directed away from openings between the internal volume of the aviary system and the enclosure).

Each light source 107, 109 produces light with a particular spectrum or selection of radiation wavelengths. As a result, one light source (or group of light sources) can produce light having one color or spectrum, while another light source (or group of light sources) can produce light having a different color or spectrum. Additionally, a single light source (or group of light sources) can selectively produce light having a different color or spectrum at different times (e.g., the light source can be controlled to produce light of one color now, and to produce light of a different color at another later time). The light sources 107, 109 may also be dimmable, such that the intensity of illumination produced by a light source can be selected or changed. Additionally, a single light source can selectively produce light having a different color at different dimming levels (e.g., the light can produce a white light at high lighting intensities, and a redish light when dimmed to a lower lighting intensity). The color (or spectrum) and intensity of a group of multiple light sources may be controlled together: as such, all light sources 107 providing illumination outside of the aviary system 103 may be controlled together (such that they all provide a similar color and intensity of lighting), while all light sources 109 providing illumination inside of the aviary system 103 may be controlled together.

The light sources 107 and 109 may thus be used to encourage (promote) or discourage certain behaviors of chicken located in the enclosure 101 and in the aviary system 103 by causing the light sources to produce light with different spectrums.

FIG. 2 is a flow chart illustrating a method 200 for controlling lighting and illumination, and in particular for providing differential illumination to control or affect animal behavior. The method 200 begins in operation 202 by identifying two or more areas in which to provide differential lighting. In one example, first and second areas may respectively correspond to an area forming part of an enclosure having an aviary system located therein, and an area forming part of an internal volume of the aviary system.

Operation 202 may further include selecting lighting parameters for each of the identified areas. Lighting parameters can include lighting state (on/off), lighting intensity, and lighting color or spectrum. The lighting parameters may be constant parameters, or time-varying parameters. For example, time-varying parameters may provide for variations in lighting intensity and/or color at different times of day, of week, of month, or of year. The time-varying parameters may further provide for variations in lighting intensity and/or color based on an age of animals in the enclosure or aviary system. In the example, light having a first spectrum may be selected for the first area, while light having a second spectrum different from the first spectrum may be selected for the second area.

In operations 204 and 206, the first and second areas are respectively illuminated with light having the first and second spectrums. In the example, the first area may be illuminated with light having a first spectrum having a higher red component than the second spectrum, while the second area may be illuminated with light having a second spectrum having a higher blue component than the first spectrum. Operations 204 and 206 may further include dimming or increasing the lighting intensity of the light in one or both of the areas, or changing the spectrum composition of the lighting in one or both of the areas.

In a first example, the light sources 109 produce red light (e.g., substantially red or redish light) having a higher red component than the light produced by the light sources 107, so as to encourage the animals to roost, feed, and/or lay eggs inside the aviary system 103. Conversely, the light sources 107 produce blue light (e.g., substantially blue or blueish light) having a higher blue component than the light produced by the light sources 109, so as to discourage the animals from roosting and laying eggs outside of the aviary system 103.

In a second example, the light sources 109 produce a substantially red light having a first intensity, and the light sources 107 produce a substantially blue light having a second intensity. In order to encourage the chicken to gather inside the aviary system at dusk, the light sources 109 may initially be dimmed to produce a substantially red light having a third intensity lower than the first intensity. As the light sources 109 are dimmed, the spectrum of the light sources may change so as to increase the relative intensity of red light within the spectrum. The intensity of the lighting from the light sources 107 may be sustained temporarily to encourage the chicken to move into the dimmed or darkened aviary system 103. The intensity of the lighting from the light sources 107 may be reduced only at a later time, for example when the chicken have had a chance to move into the aviary system 103 for the night.

In a third example, the light sources 109 produce a substantially red light having a first intensity, and the light sources 107 produce a substantially blue light having a second intensity. In order to encourage the chicken to move out of the aviary system 103 (e.g., to enable the aviary system 103 to be cleaned), the light sources 107 may transition to produce a substantially red light while the light sources 109 transition to produce a substantially blue light. The blue light produced by the light sources 109 inside of the aviary system 103 may encourage the chicken to move out of the aviary system 103, while the red light produced by the light sources 107 in the enclosure 101 may encourage the chicken to rest in the enclosure 101.

Figure 3:
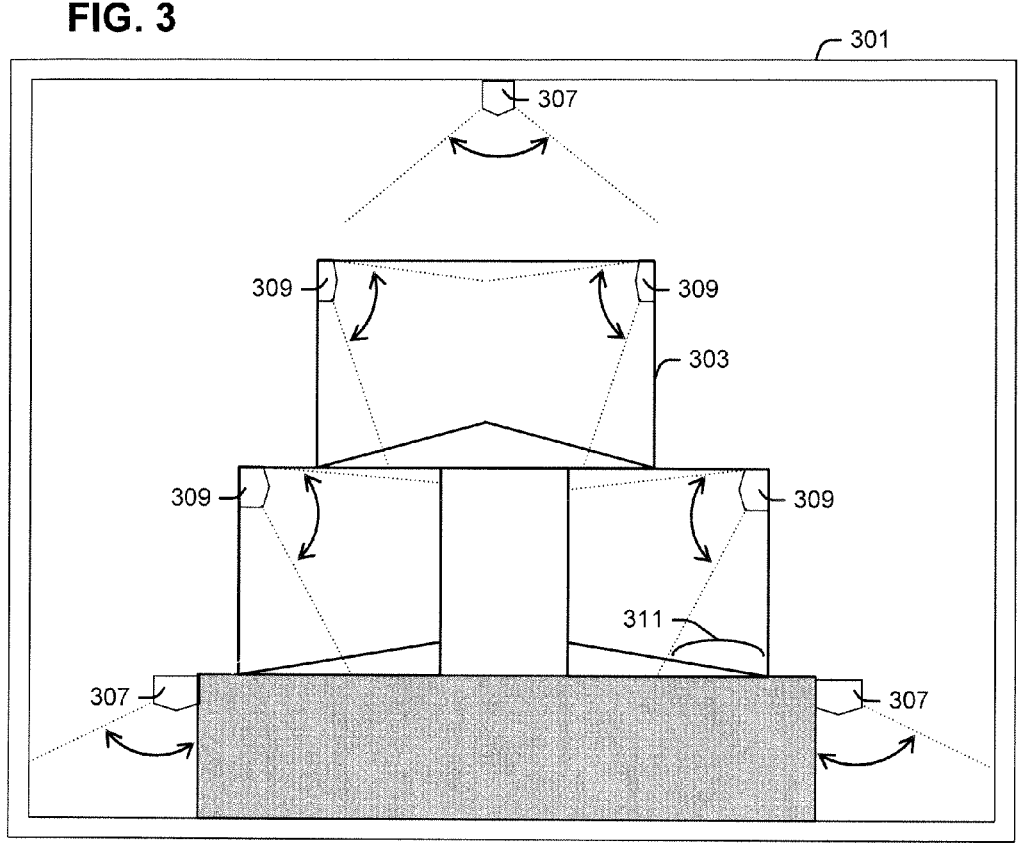
FIG. 3 shows a cross-sectional view of an enclosure containing an aviary system and having a differential illumination system.

FIG. 3 shows a cross-sectional view of a second enclosure 301 containing one or more aviary systems 303 for housing animals. In the example of FIG. 3, light sources 307 provide illumination having a first spectrum (e.g., a blue light spectrum) to at least some areas in the enclosure 301, such as areas located above or on top of the aviary system 303, and floor areas located next to or around the aviary system 303. The first spectrum may be selected to substantially reduce or eliminate egg laying in the areas illuminated by the light sources 307. Light sources 309 provide illumination having a second spectrum (e.g., a red light spectrum) to at least some areas within the aviary systems 303. The second spectrum may be selected to encourage or promote egg laying in the areas illuminated by the light sources 309. Some areas 311 within the aviary system 303 may receive substantially no illumination, or may receive no direct illumination from directional light sources 307 or 309.

Figure 4:
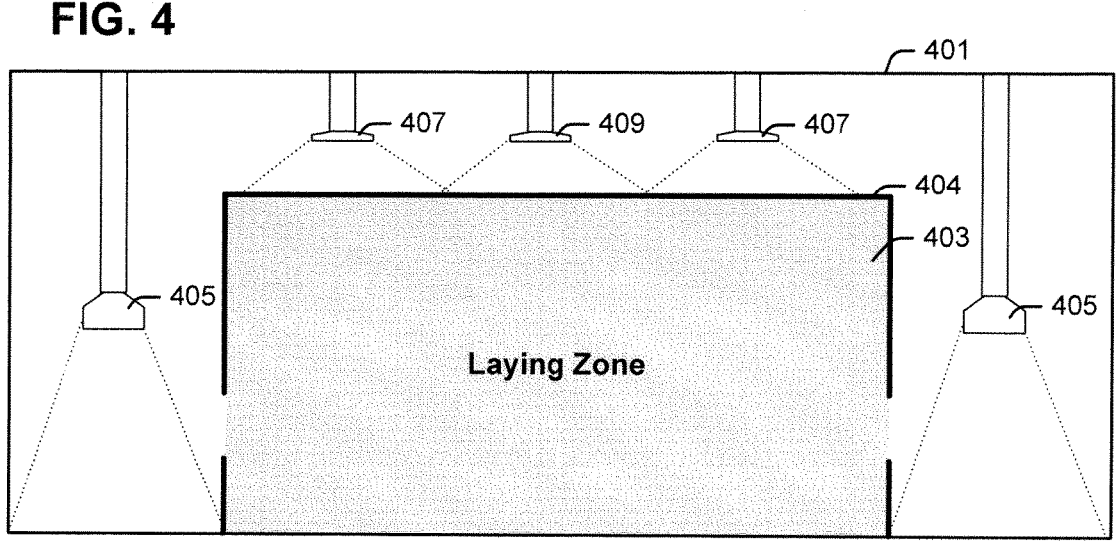
FIG. 4 shows a cross-sectional view of an enclosure containing an egg laying zone and having a differential illumination system.

FIG. 4 shows a cross-sectional view of a third enclosure 401 containing one or more egg laying zones 403. In the example shown, the enclosure 401 may alternatively correspond to an aviary system. The enclosure 401 includes various light sources 405, 407, and 409, which may each provide illumination having the same or different spectrums. For instance, light sources 405 may produce light with a first spectrum for encouraging scratching behavior, while light sources 407 and 409 may produce light with a second spectrum for encouraging roosting behavior. At least portions of the egg laying zone 403 may be surrounded by an opaque or substantially opaque barrier 404 which is used to limit the amount of illumination from the light sources 405, 407, and 409 which penetrates within the egg laying zone 403.

Figure 5:
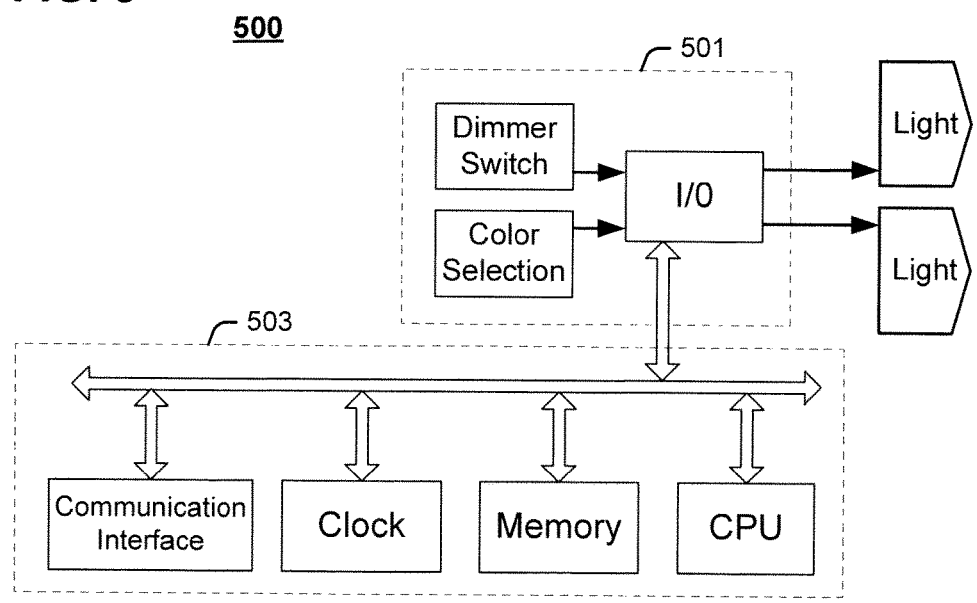
FIG. 5 shows a control system for controlling lighting and illumination produced by a differential illumination system.

FIG. 5 shows a control system 500 for controlling lighting in an egg production facility having a differential illumination system, such as system 100. The control system 500 can include various manual controls 501 to enable the lighting state (on/off), lighting intensity, and lighting color or spectrum to be selected for one or more light sources. For example, the manual controls may include a dimmer switch or module, a color selection switch or module, and other switches or modules to control one or more light sources.

The control system 500 can additionally or alternatively include automated controls to manage the lighting state of light sources. A processing system 503 can perform partially automated or fully automated control of one or more light sources, and can include one or more processors or CPUs, one or more memories, a clock, and a communication interface (e.g., network interface, user interface, and/or the like). The memory can be a non-transitory machine readable medium storing machine readable instructions for execution by the one or more processors, including instructions for selectively controlling light sources as described herein.

A reference to an element in the singular is not intended to mean "one and only one" unless specifically so stated, but rather "one or more." For example, a light source may refer to one or more light sources, an aviary system may refer to one or more aviary systems, a light or light spectrum may refer to one or more lights or light spectrums, a control signal may refer to one or more control signals, and a signal may refer to differential voltage signals. Unless specifically stated otherwise, the term "some" refers to one or more.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

In one aspect of the disclosure, when actions or functions are described as being performed by an item (e.g., producing, selecting, controlling, illuminating, determining, providing, generating, or any other action or function), it is understood that such actions or functions may be performed by the item directly or indirectly. In one aspect, when an element or module is described as performing an action, the element or module may be understood to perform the action directly. In one aspect, when an element or module is described as performing an action, the element or module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A system comprising:
   an aviary system located within an enclosure, wherein the aviary system includes an internal volume for housing animals, and wherein the animas can move between the aviary system and the enclosure;
   a first light source producing light with a first spectrum, wherein the first light source illuminates at least part of the internal volume of the aviary system to cause a predetermined behavioral response in animals located in the internal volume; and
   a second light source producing light with a second spectrum different from the first spectrum, wherein the second light source illuminates at least part of the enclosure outside of the aviary system to discourage a predetermined animal behavior in the enclosure outside of the aviary system;
   wherein the first light source is a directional light source that concentrates illumination within the aviary system, and the second light source is a directional light source that avoids illumination from penetrating inside the aviary system;
   wherein the first light source is directed away from an opening between the internal volume of the aviary system and the enclosure; and the second light source is directed away from an opening between the enclosure and the internal volume of the aviary system.

2. The system according to claim 1, wherein the second light source includes light emitting diodes (LEDs).

3. The system according to claim 1, wherein the first spectrum of the first light source has a higher red component than the second spectrum of the second light source.

4. The system according to claim 3, wherein the first light source illuminates an area designed for the animals to lay eggs, roost, or feed.

5. The system according to claim 1, wherein the second spectrum of the second light source has a higher blue component than the first spectrum of the first light source.

6. The system according to claim 5, wherein the second light source illuminates an area in which laying eggs is discouraged.

7. The system according to claim 1, wherein:
   the second light source illuminates a floor area of the enclosure located substantially below or around the aviary system.

8. The system according to claim 1, wherein the second light source illuminates an area of the enclosure located substantially above the aviary system.

* * * * *